(12) United States Patent
Novak

(10) Patent No.: US 7,186,353 B2
(45) Date of Patent: Mar. 6, 2007

(54) ALKALINE EARTH OR ALKALI METAL SALTS FOR ANTIFREEZE, DEICING, AND FREEZE CONTROL

(75) Inventor: Stephen E. Novak, Stanley, NC (US)

(73) Assignee: Chemical Specialties, Inc., Charlotte, NC (US)

( * ) Notice: Subject to any disclaimer, the term of this patent is extended or adjusted under 35 U.S.C. 154(b) by 0 days.

(21) Appl. No.: 10/734,744

(22) Filed: Dec. 12, 2003

(65) Prior Publication Data

US 2004/0164270 A1 Aug. 26, 2004

Related U.S. Application Data

(60) Provisional application No. 60/433,107, filed on Dec. 13, 2002.

(51) Int. Cl.
*C09K 3/18* (2006.01)

(52) U.S. Cl. .................... 252/70; 106/13; 428/403

(58) Field of Classification Search .................. 252/70; 106/13; 428/403
See application file for complete search history.

(56) References Cited

U.S. PATENT DOCUMENTS

| | | | | |
|---|---|---|---|---|
| 2,980,620 | A * | 4/1961 | Hatch | 252/70 |
| 4,803,007 | A * | 2/1989 | Garber | 252/70 |
| 5,296,028 | A * | 3/1994 | Korhonen et al. | 106/815 |
| 5,531,931 | A * | 7/1996 | Koefod | 252/387 |
| 6,398,979 | B2 * | 6/2002 | Koefod et al. | 252/70 |
| 6,569,348 | B1 * | 5/2003 | Smith et al. | 252/70 |
| 2003/0146409 | A1 * | 8/2003 | Vickers et al. | 252/70 |
| 2004/0021127 | A1 * | 2/2004 | Koefod et al. | 252/70 |

FOREIGN PATENT DOCUMENTS

| | | | |
|---|---|---|---|
| CA | 2051615 A | * | 3/1993 |
| JP | 57-159890 | * | 10/1982 |
| JP | 3-281599 | * | 12/1991 |
| RU | 2130958 C1 | * | 5/1999 |
| RU | 2167179CA | * | 9/2000 |
| SU | 302944 A | * | 7/1972 |

OTHER PUBLICATIONS

Derwent Abstract No. 1973-08789U, abstract of Soviet Union Patent Specification No. 302944A (Feb. 1968).*
Derwent Abstract No. 1986-012189, abstract of Soviet Union Patent Specification No. 760697A (Aug. 1985).*
Derwent Abstract No. 2000-315875, abstract of Russian Patent Specification No. 2130958C1 (May 1989).*
Derwent Abstract No. 2001-501278, abstract of Russian Patent Specification No. 2167179C1 (May 2001).*
Derwent Abstract No. 1985-305771, abstract of Japanese Patent Specification No. 60195178 (Oct. 1985).*
Derwent Abstract No. 1976-84468X, abstract of Soviet Union Patent Specification No. 502,077 A (Apr. 1976).*

* cited by examiner

*Primary Examiner*—Anthony J. Green
(74) *Attorney, Agent, or Firm*—McAndrews, Held & Malloy

(57) ABSTRACT

Antifreeze, deicing, and freeze control systems comprising aqueous alkaline earth or alkali metal salts of calcium, sodium and magnesium nitrate used separately or in mixtures with other substances currently used for these applications such as sodium chloride, magnesium chloride, calcium chloride, diethylene glycol, and acetates of magnesium, potassium and sodium, are presented.

26 Claims, 1 Drawing Sheet

ALKALINE EARTH OR ALKALI METAL SALTS FOR ANTIFREEZE, DEICING, AND FREEZE CONTROL

RELATED APPLICATIONS

This application claims the priority of provisional application No. 60/433,107, filed Dec. 13, 2002, which is incorporated by reference in its entirety to provide continuity of disclosure.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates generally to antifreeze, deicing, or freeze control compositions comprising at least one alkaline earth metal or alkali metal salt, for example, sodium nitrate, magnesium nitrate, or calcium nitrate.

Antifreeze and deicing agents are widely used to remove ice from or prevent the formation of ice upon surfaces such as roadways and equipment. The most widely used antifreeze and deicing agents contain sodium chloride or magnesium chloride. Due to the chlorine content, such chlorine containing antifreeze and deicing agents can cause significant damage to concrete, masonry, and metal surfaces, such as ferrous metal, when brought into aqueous solutions. Chlorine containing antifreeze and deicing agents are also detrimental to plants because chlorine is known to hinder the water uptake by roots of trees and lower plants.

Freeze control agents are widely used to prevent aggregates, such as coal, from freezing during transport in railcars, trucks, or barges. The freeze control agents are sprayed on the aggregates prior to or during loading of products into transport vessels. The most commonly used freeze control agents for this application contain calcium chloride. Again, due to the presence of chlorine, such calcium chloride containing freeze control agents have been shown to damage transport equipment and to increase the rate of corrosion in coal fired burners and power plants.

Ethylene glycol was formerly employed as a freeze control agent. Dowell M185 was sold commercially by Dowell division of Dow Chemical for many years for this purpose. Dowell M185 is a 60% ethylene glycol solution. Due to environmental concerns with ethylene glycol, this material is no longer sold for use as antifreeze for coal.

In an attempt to circumvent the corrosion issues associated with chlorine containing substances, diethylene glycol (DEG) has been employed as a freeze control agent. However, DEG is more expensive than calcium chloride and therefore, is not a cost-effective treatment for preventing freezing of aggregates. For example, the cost of treatment of one ton of coal with DEG can be two or three times greater than treatment with calcium chloride. Also, DEG is understood to be less effective as antifreeze for coal than ethylene glycol.

Therefore, there exists a long felt need for a freeze control composition that is economical to prepare and does not cause or accelerate corrosion. Additionally, there also exists a long felt need for antifreeze and deicing agents that do not cause or accelerate corrosion and are not detrimental to plants.

As defined in this disclosure, the term "antifreeze" is defined herein as an antifreeze, deicing, or freeze control composition. As defined in this disclosure, the term "aggregates" is defined herein as a plurality of any substance transported in bulk, such as coal, gravel, and grain.

SUMMARY OF THE INVENTION

The novel antifreeze of the present invention comprises at least one alkaline earth metal or alkali metal salt chosen from sodium nitrate, magnesium nitrate, or calcium nitrate. As disclosed herein, a method of making the novel antifreeze of the present invention comprising at least one alkaline earth metal or alkali metal salt chosen from sodium nitrate, magnesium nitrate, or calcium nitrate is also presented. The antifreeze of the present invention optionally further comprises at least one other antifreeze, deicing, or freeze control agent such as diethylene glycol, calcium chloride, magnesium chloride, sodium chloride, magnesium acetate, or potassium acetate, for example. Optionally, the antifreeze of the present invention can further comprise corrosion inhibitors, such as sodium nitrite or calcium nitrite, for instance. Freeze resistant coal comprising coal treated with the novel antifreeze of the present invention comprising at least one alkaline or alkali metal salt chosen from sodium nitrate, magnesium nitrate, or calcium nitrate is also presented.

Applications for the novel antifreeze of the present invention include, but are not limited to, a method of removing ice from surfaces such as roadways, equipment, and aggregates, such as coal, a method of preventing ice formation upon surfaces such as roadways and equipment, and a method of preventing freezing of aggregates, such as coal, during or prior to transport in railcars, trucks, or barges.

An embodiment of the invention is an aggregate treated with antifreeze comprising at least one of calcium nitrate, sodium nitrate, or magnesium nitrate is presented. Another embodiment of the invention is method of removing ice from a surface comprising (i) finding a surface having at least a partial coating of ice or snow; and (ii) contacting said at least partial coating with a composition comprising at least one of calcium nitrate, sodium nitrate, or magnesium nitrate. Yet another embodiment of the invention is a method of preventing ice formation on a surface comprising contacting said surface with an antifreeze, wherein said antifreeze comprises at least one of calcium nitrate, sodium nitrate, or magnesium nitrate. A further embodiment of the invention is a method of preventing freezing of aggregates comprising contacting said aggregates with an antifreeze, wherein said antifreeze comprises at least one of calcium nitrate, sodium nitrate, or magnesium nitrate. An even further embodiment of the invention is a method of preventing freezing of coal comprising applying magnesium nitrate to the surface of said coal.

DETAILED DESCRIPTION OF THE INVENTION

Figure 1:
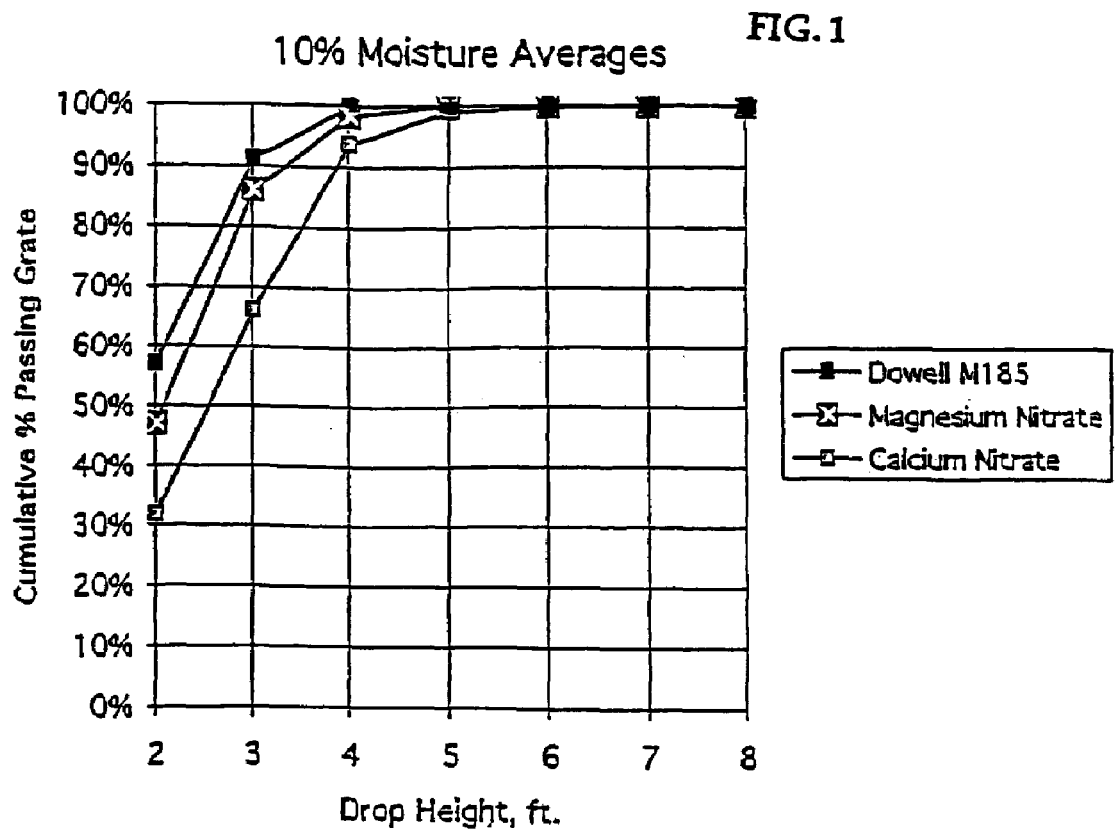
FIG. 1 is a plot showing the performance of the prior art ethylene glycol freeze control agents, versus the present magnesium nitrate and calcium nitrate freeze control agents, in frozen coal containing 10% added moisture, as described in the Example.

While the invention will be described in connection with one or more embodiments, it will be understood that the invention is not limited to those embodiments. On the contrary, the invention includes all alternatives, modifications, and equivalents as may be included within the spirit and scope of the appended claims.

Antifreeze that comprises alkaline earth metal or alkali metal salt solutions of an active agent, which is at least one of sodium nitrate, magnesium nitrate, or calcium nitrate, is disclosed.

The inventor has unexpectedly discovered superior results can be achieved using a salt that is at least one of sodium nitrate, magnesium nitrate, or calcium nitrate in antifreeze. Calcium nitrate, for example, is highly compatible for use in antifreeze, deicing, or freeze-control agents since the freezing point of an aqueous solution containing 50% by weight of $Ca(NO_3)_2$ is approximately −31° F. In addition, the antifreeze of the present invention does not exhibit corrosive effects on ferrous metals and other surfaces due to the absence of chloride. Furthermore, the antifreeze of the present invention is not detrimental to plants. In fact, the nitrogen contained in the antifreeze of the present invention is one of thirteen essential elements required for plant nutrition. Also, magnesium and calcium are micronutrients that are essential for healthy plant growth. Moreover, the antifreeze compositions of the present invention are economical.

The antifreeze of the present invention comprises as the active agent at least one alkaline earth metal or alkali metal salt chosen from calcium nitrate, sodium nitrate, or magnesium nitrate. In one embodiment of the invention, the antifreeze comprises a mixture comprising at least two of calcium nitrate, sodium nitrate, or magnesium nitrate. In another embodiment of the invention, the antifreeze further comprises at least one other antifreeze agent such as diethylene glycol, calcium chloride, magnesium chloride, sodium chloride, magnesium acetate, or potassium acetate, for instance. In yet another embodiment of the invention, the antifreeze compositions further comprise at least one corrosion inhibitor, such as sodium nitrite or calcium nitrite, for example.

The concentration of the active agent or combination of the active agents in the antifreeze compositions of the present invention ranges from 10 to 55 wt. %, such as from 30 to 55 wt. %, and such as from 30 to 45 wt. %, and further such as from 20 to 40 wt. %. If the antifreeze, deicing, or freeze control composition is a combination of at least two of the active agents, the total concentration of alkali metal salts in said antifreeze, deicing, or freeze control compositions ranges from 30 to 45 wt. %. In yet another embodiment of the invention wherein the compositions further comprise sodium nitrite or calcium nitrite, the concentration of sodium nitrite or calcium nitrite in said antifreeze, deicing, or freeze-control compositions ranges from 0 to 5 wt. %, such as from 0.5 to 1.5 wt. %.

The concentration of calcium nitrate in the compositions optionally can range from 30 to 55 wt. %. In another embodiment of the invention, the concentration of sodium nitrate in the compositions optionally can range from 30 to 45 wt. %. In yet another embodiment of the invention, the concentration of magnesium nitrate in the compositions optionally can range from 20 to 40 wt. %.

Conventional application equipment can be used to spray or otherwise apply the present composition on a material or surface to be treated, such as coal or a roadway.

The antifreeze can be mixed with coal in any suitable proportion that reduces the effort necessary to break up the coal into individual particles. Alternatively contemplated treatment levels of the present treatment solutions are: at a minimum, at least 0.1 pint per ton (0.05 liter per metric ton), alternatively at least 0.2 pint per ton (0.1 liter per metric ton), alternatively at least 0.4 pint per ton (0.2 liter per metric ton), alternatively at least 0.7 pint per ton (0.35 liter per metric ton), alternatively at least 1 pint per ton (0.5 liter per metric ton), alternatively at least 2 pints per ton (1 liter per metric ton), alternatively at least 4 pints per ton (2 liters per metric ton), alternatively at least 5 pints per ton (2.5 liters per metric ton), alternatively at least 10 pints per ton (5 liters per metric ton). Alternatively contemplated treatment levels of the present treatment solutions are: at a maximum, at most 10 pints per ton (5 liters per metric ton), alternatively at most 8 pints per ton (4 liters per metric ton), alternatively at most 5 pints per ton (2.5 liters per metric ton), alternatively at most 3 pints per ton (1.5 liter per metric ton), alternatively at most 1 pint per ton (0.5 liter per metric ton). The inventors expressly contemplate that any minimum from the above alternatives and any maximum from the above alternatives can be combined to form an operative range. For example, a treatment level of two pints per ton (1 liter per metric ton) can be used.

The coal to be treated can contain from 1 to 20 weight percent water, alternatively from 5 to 15% by weight water, alternatively about 10% by weight water, before treatment. The coal can instead contain more or less water; these proportions are merely exemplary.

The following working example is provided for illustrative purposes and is not to be construed to limit the scope of the claims in any manner.

EXAMPLE

The freeze control performance, in coal, of a calcium nitrate solution and a magnesium nitrate solution were compared to the freeze control performance of an ethylene glycol solution formerly used commercially as an antifreeze for coal. The calcium nitrate solution was an aqueous solution containing 49% by weight calcium nitrate, $Ca(NO_3)_2$. The magnesium nitrate solution was an aqueous solution containing 40% by weight $Mg(NO_3)_2$. The ethylene glycol solution was an aqueous solution containing 60% by weight ethylene glycol.

A sample of minus 6 U.S. mesh coal was thoroughly mixed then divided into two samples. The moisture contents of the two samples were adjusted to 10.3% (reported as 10% in Tables 1 and 2), and 15.4% (reported as 15% in Tables 1 and 2). Each sample was then divided into three portions, each placed in a separate plastic bag. The freeze control agents were added to these portions at the rate of two pints per ton (1 liter per metric ton), using a syringe. The freeze control agents were then blended into the samples, first by hand in the bags, and then for one minute in a Hobart mixer.

For each of the three freeze control agent samples at each coal moisture content, six pans, lubricated with silicone mold release agent, were filled with approximately one kilogram of treated coal each. The samples were consolidated by dropping each pan three times from one inch above a laboratory bench. The samples in the pans were then frozen at −10° C. (14° F.) for 24 hours.

To determine the effectiveness of each freeze control agent in reducing the cohesive strength of the frozen coal, the pans were then inverted and the frozen samples dropped onto a grate, made of 0.25 in. (6 mm) thick by one inch (25 mm) high steel bars, having 1.25 in. (32 mm) square openings. In each instance, the sample was first dropped at the lowest height. The coal passing the grate was removed and weighed. The remaining coal on top of the grate was retrieved, the drop height was increased by one foot (30.5 cm), and this coal was again dropped onto the grate. This process was then repeated at successively higher drop heights until all the coal had dropped through the grate, at which point the test on that sample was complete.

The number of drops at a given height and the drop heights used were determined from tests run previously with the control freeze control agent treated coal. At 10.3% coal moisture content, the frozen coal breaks up easily so it was dropped from each height only once, starting from a height of two feet (61 cm). At 15.4% moisture, there was less break-up, so the coal was dropped one time from two feet (61 cm), it was not dropped from three, four, or five feet (91 cm, 122 cm, and 152 cm, respectively), and it was dropped ten times from each height starting from a height of six feet (183 cm). The set of heights and number of drops were the same for each freeze control agent at a particular coal moisture content.

Figure 2:
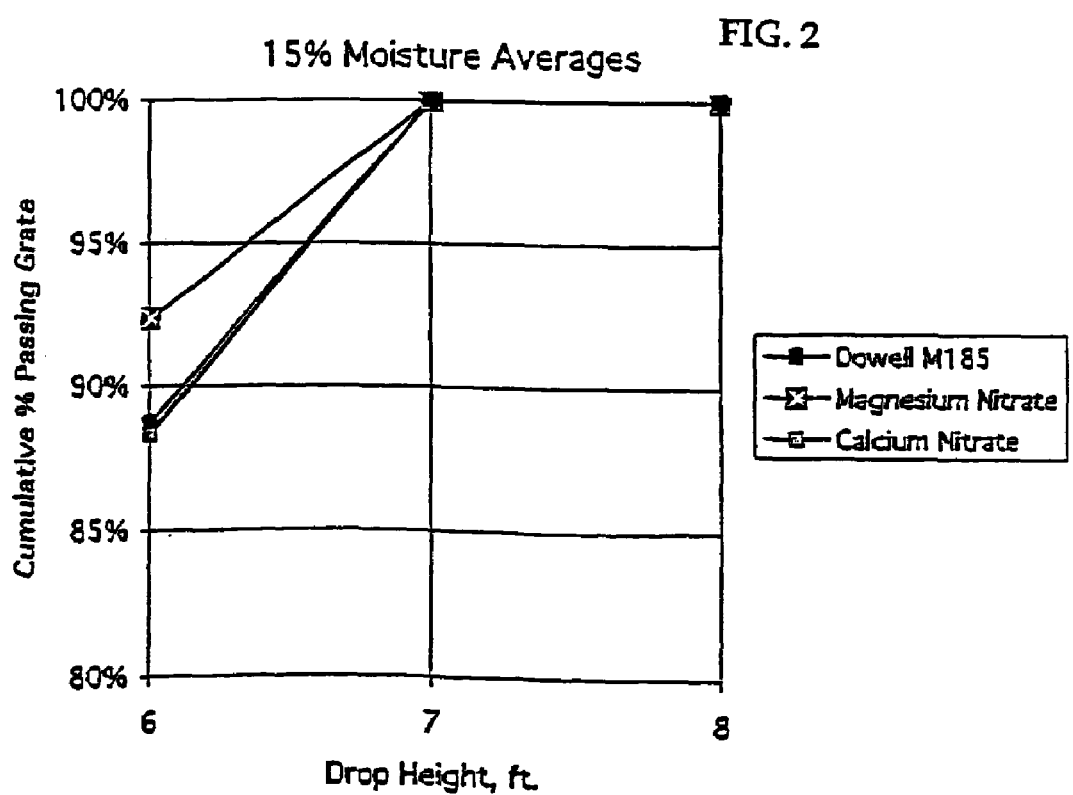
FIG. 2 is a plot similar to FIG. 1, showing performance in frozen coal containing 15% added moisture.

The plots of the data, including a comparison of the freeze control agents tested, are given in Tables 1 and 2. FIGS. 1 and 2 are plots of the data in the cumulative (lower) portion of each table. Note that the sums of all weights in each column of the upper portion of each table are equal to the total weight of the treated coal sample.

In the less-stringent 10.3% moisture content test, the ethylene glycol control was found to be the best freeze control agent, followed by magnesium nitrate, and calcium nitrate in that order. The maximum difference in the average percent passing, comparing the control and magnesium nitrate, was 10% (at 2 ft., 61 cm, drop height). 100% of the control freeze control agent passed through the grate after the 4 ft. (122 cm) drop, compared to 98% for magnesium nitrate, and 94% for calcium nitrate. Note that these are the averages of six pans dropped for each freeze control agent.

Tests conducted at the more stringent 15.4% moisture content show that magnesium nitrate was more effective than the other two, as it released more of the coal at a lower drop height. In this test, calcium nitrate provided performance almost identical to that of ethylene glycol, which formerly was used commercially as a freeze control agent.

TABLE 1

| Drop Height, ft. | Drop Height, cm. | HO—Et—OH | Mg(NO$_3$)$_2$ | Ca(NO$_3$)$_2$ |
|---|---|---|---|---|
| 10% Moisture: Wt. of Coal Passing Grate in Each Drop (g) | | | | |
| 2 | 61 | 3410.4 | 2802 | 1903.6 |
| 3 | 91 | 2031.5 | 2312.3 | 2050 |
| 4 | 122 | 508.1 | 726.3 | 1639.5 |
| 5 | 152 | 17 | 103.6 | 320.9 |
| 6 | 183 | test complete | test complete | 43.3 |
| 7 | 213 | test complete | test complete | 14.1 |
| 8 | 244 | test complete | test complete | test complete |
| Sample weight (g) | | 5967 | 5944.2 | 5971.4 |

TABLE 1-continued

| Drop Height, ft. | Drop Height, cm. | HO—Et—OH | Mg(NO$_3$)$_2$ | Ca(NO$_3$)$_2$ |
|---|---|---|---|---|
| 10% Moisture: Cumulative Wt. % of Coal Passing Grate | | | | |
| 2 | 61 | 57.2 | 47.1 | 31.9 |
| 3 | 91 | 91.2 | 86.1 | 66.2 |
| 4 | 122 | 99.7 | 98.3 | 93.7 |
| 5 | 152 | 100 | 100 | 99 |
| 6 | 183 | test complete | test complete | 99.8 |
| 7 | 213 | test complete | test complete | 100 |
| 8 | 244 | test complete | test complete | test complete |

TABLE 2

| Drop Height, ft. | Drop Height, cm. | HO—Et—OH | Mg(NO$_3$)$_2$ | Ca(NO$_3$)$_2$ |
|---|---|---|---|---|
| 15% Moisture: Wt. of Coal Passing Grate in Each Drop (g) | | | | |
| 2 | 61 | 157.3 | 196.4 | 181 |
| 3 | 91 | not tested | not tested | not tested |
| 4 | 122 | not tested | not tested | not tested |
| 5 | 152 | not tested | not tested | not tested |
| 6 | 183 | 5110.2 | 5282 | 5106.5 |
| 7 | 213 | 669.1 | 450.9 | 699.4 |
| 8 | 244 | test complete | test complete | test complete |
| Sample weight (g) | | 5936.6 | 5929.3 | 5986.9 |
| 15% Moisture: Cumulative Wt. % of Coal Passing Grate (g) | | | | |
| 2 | 61 | 2.6 | 3.3 | 3 |
| 3 | 91 | not tested | not tested | not tested |
| 4 | 122 | not tested | not tested | not tested |
| 5 | 152 | not tested | not tested | not tested |
| 6 | 183 | 88.7 | 92.4 | 88.3 |
| 7 | 213 | 100 | 100 | 100 |
| 8 | 244 | test complete | test complete | test complete |

The invention claimed is:

1. An aggregate treated with an antifreeze comprising as components calcium nitrate, magnesium nitrate, and at least one of diethylene glycol, calcium chloride, magnesium chloride, or magnesium acetate, wherein the total concentration of said components in said antifreeze ranges from 10 to 55 wt. %.

2. The aggregate of claim 1, wherein the concentration of calcium nitrate in said antifreeze ranges from 30 to 55 wt. %.

3. An aggregate treated with an antifreeze comprising magnesium nitrate and at least one corrosion inhibitor, wherein the concentration of magnesium nitrate in said antifreeze ranges from 20 to 40 wt. %.

4. The aggregate of claim 3, wherein said at least one corrosion inhibitor comprises at least one of sodium nitrite or calcium nitrite.

5. The aggregate of claim 4, wherein the concentration of said corrosion inhibitor is greater than zero and not greater than 5 wt. %.

6. The aggregate of claim 5, wherein the concentration of said corrosion inhibitor ranges from 0.5 to 1.5 wt. %.

7. A method of preventing freezing of coal comprising applying an antifreeze comprising magnesium nitrate and at least one corrosion inhibitor to the surface of said coal, wherein the concentration of magnesium nitrate in said antifreeze ranges from 20 to 40 wt. %.

8. The method of claim 7, wherein the at least one corrosion inhibitor comprises at least one of sodium nitrite or calcium nitrite.

9. The method of claim 7, wherein the concentration of said corrosion inhibitor is greater than zero and not greater than 5 wt. %.

10. The method of claim 7, wherein the concentration of said corrosion inhibitor ranges from 0.5 to 1.5 wt. %.

11. An aggregate treated with an antifreeze comprising magnesium nitrate and at least one other antifreeze agent, wherein the concentration of magnesium nitrate in said antifreeze ranges from 20 to 40 wt. %.

12. The aggregate of claim 11, wherein said at least one other antifreeze agent is at least one of diethylene glycol, calcium chloride, magnesium chloride, sodium chloride, magnesium acetate, or potassium acetate.

13. A method of preventing freezing of coal aggregates comprising contacting said coal aggregates with an antifreeze comprising as components calcium nitrate, magnesium nitrate, and at least one of diethylene glycol, calcium chloride, magnesium chloride, sodium chloride, magnesium acetate, or potassium acetate, wherein the total concentration of said components in said antifreeze ranges from 30 to 45 wt. %.

14. An aggregate treated with an antifreeze comprising as components calcium nitrate and magnesium nitrate, wherein said antifreeze is an aqueous solution of said components and wherein the total concentration of said components in said antifreeze ranges from 10 to 55 wt. %.

15. The aggregate of claim 14, wherein said antifreeze further comprises at least one other antifreeze agent different from said components.

16. The aggregate of claim 15, wherein said at least one other antifreeze agent is at least one of diethylene glycol, calcium chloride, magnesium chloride, sodium chloride, magnesium acetate, or potassium acetate.

17. An aggregate treated with a composition comprising an antifreeze and at least one corrosion inhibitor, wherein the antifreeze consists essentially of calcium nitrate and wherein the concentration of said calcium nitrate in said composition ranges from 10 to 55 wt. %.

18. The aggregate of claim 17, wherein the concentration of said calcium nitrate in said composition ranges from 30 to 55 wt. %.

19. The aggregate of claim 17, wherein the at least one corrosion inhibitor comprises at least one of sodium nitrite or calcium nitrite.

20. The aggregate of claim 17, wherein the concentration of said corrosion inhibitor in said composition is greater than zero and not greater than 5 wt. %.

21. The aggregate of claim 17, wherein the concentration of said corrosion inhibitor in said composition ranges from 0.5 to 1.5 wt. %.

22. A method of preventing freezing of an aggregate comprising applying a composition comprising an antifreeze and at least one corrosion inhibitor to the surface of said aggregate, wherein the antifreeze consists essentially of calcium nitrate and wherein the concentration of said calcium nitrate in said composition ranges from 10 to 55 wt. %.

23. The method of claim 22, wherein the concentration of said calcium nitrate in said composition ranges from 30 to 55 wt. %.

24. The method of claim 22, wherein the at least one corrosion inhibitor comprises at least one of sodium nitrite or calcium nitrite.

25. The method of claim 22, wherein the concentration of said corrosion inhibitor in said composition is greater than zero and not greater than 5 wt. %.

26. The method of claim 22, wherein the concentration of said corrosion inhibitor in said composition ranges from 0.5 to 1.5 wt. %.

* * * * *